(12) United States Patent
Fudaba et al.

(10) Patent No.: US 9,143,965 B2
(45) Date of Patent: Sep. 22, 2015

(54) WIRELESS STATION AND TRANSMISSION POWER DETERMINATION METHOD

(71) Applicant: FUJITSU LIMITED, Kawasaki-shi, Kanagawa (JP)

(72) Inventors: Nobukazu Fudaba, Yokohama (JP); Junji Otonari, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/152,687

(22) Filed: Jan. 10, 2014

(65) Prior Publication Data

US 2014/0273875 A1 Sep. 18, 2014

(30) Foreign Application Priority Data

Mar. 18, 2013 (JP) ................................. 2013-055567

(51) Int. Cl.
*H04W 24/08* (2009.01)
*H04W 52/24* (2009.01)
*H04W 52/14* (2009.01)

(52) U.S. Cl.
CPC ............ *H04W 24/08* (2013.01); *H04W 52/241* (2013.01); *H04W 52/143* (2013.01)

(58) Field of Classification Search
USPC ......... 455/422.1, 450, 452.1, 522, 63.1, 63.2, 455/67.11, 67.13, 69; 370/252, 254; 375/227, 229
See application file for complete search history.

(56) References Cited

U.S. PATENT DOCUMENTS

| | | | |
|---|---|---|---|
| 6,347,226 B1 | 2/2002 | Virtanen | |
| 8,594,719 B2* | 11/2013 | Chang et al. | 455/522 |
| 2007/0060062 A1* | 3/2007 | Wengerter et al. | 455/63.2 |
| 2008/0240217 A1* | 10/2008 | Lee et al. | 375/227 |
| 2009/0185502 A1* | 7/2009 | Sung et al. | 370/252 |
| 2012/0009936 A1 | 1/2012 | Ishii et al. | |
| 2014/0141791 A1* | 5/2014 | Razavi et al. | 455/452.1 |

FOREIGN PATENT DOCUMENTS

| | | |
|---|---|---|
| JP | 2002-500845 A | 1/2002 |
| JP | 2009-49485 A | 3/2009 |

* cited by examiner

*Primary Examiner* — Thanh Le
(74) *Attorney, Agent, or Firm* — Arent Fox LLP

(57) ABSTRACT

A wireless station includes: a receiver configured to receive information on a reception quality from a wireless communication apparatus that is connected to the wireless station; and a processor coupled to the receiver and configured to: calculate, based on the reception quality, an index value indicating a difference between a signal-to-interference ratio in the wireless communication apparatus and transmission power of the wireless station, calculate a statistical amount of the index value calculated with regard to each of the plurality of reception qualities, and determine the transmission power in accordance with the statistical amount.

17 Claims, 17 Drawing Sheets

WIRELESS STATION AND TRANSMISSION POWER DETERMINATION METHOD

CROSS-REFERENCE TO RELATED APPLICATION

This application is based upon and claims the benefit of priority of the prior Japanese Patent Application No. 2013-055567, filed on Mar. 18, 2013, the entire contents of which are incorporated herein by reference.

FIELD

The embodiments discussed herein are related to a wireless station and a transmission power determination method.

BACKGROUND

A small scale wireless base station having a coverage area, that is, a cell radius of approximately several tens of meters is proposed as a wireless station used in a communication system such as a mobile phone system. The above-mentioned small scale wireless base station is referred to as femto base station, pico base station, or the like. A cell formed by the above-mentioned small scale wireless base station is referred to as "femto cell" or "pico cell", for example. On the other hand, a wireless station forming a macro cell having a wide coverage area with a radius of approximately several kilometers is referred to as macro base station.

As a related art technology, the following unit has been proposed. In a case where a base station apparatus is in close proximity to a mobile station apparatus while being provided in a host node apparatus, the base station apparatus is shifted to a service state, and in a case where the base station apparatus is not in close proximity to all the mobile station apparatuses, the base station apparatus is shifted to a wireless unit stopped state (for example, see Japanese Laid-open Patent Publication No. 2009-49485).

In addition, the following setting has been proposed. To save usable resources, when a demand for a traffic capacity is small in a coverage area of a first base station, a first transceiver unit is deactivated (for example, see Japanese Laid-open Patent Publication No. 2002-500845).

SUMMARY

According to an aspect of the invention, a wireless station includes: a receiver configured to receive information on a reception quality from a wireless communication apparatus that is connected to the wireless station; and a processor coupled to the receiver and configured to: calculate, based on the reception quality, an index value indicating a difference between a signal-to-interference ratio of the wireless communication apparatus and transmission power of the wireless station, calculate a statistical amount of the index value calculated with regard to each of the plurality of reception qualities, and determine the transmission power in accordance with the statistical amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described with reference to the drawings.

While inventing the present embodiments, observations were made regarding a related art. Such observations include the following, for example.

In a communication system of the related art, an interference may be generated between plural cells in some cases. For example, when the above-mentioned femto base station or pico base station is installed in a coverage area of the macro base station, an interference may be generated between the femto cell or pico cell and the macro cell. The interference between the cells can be suppressed by controlling the coverage area while the transmission power of the base station apparatus is increased or decreased. Since an interference state between the cells changes over time, a control on the coverage area is desirably carried out promptly.

Accordingly, the embodiments disclosed in the present specification are aimed at improving a control speed for the coverage area of a wireless station such as the femto base station, the pico base station, and the macro cell.

1. Coverage Control Operation

Figure 1A:
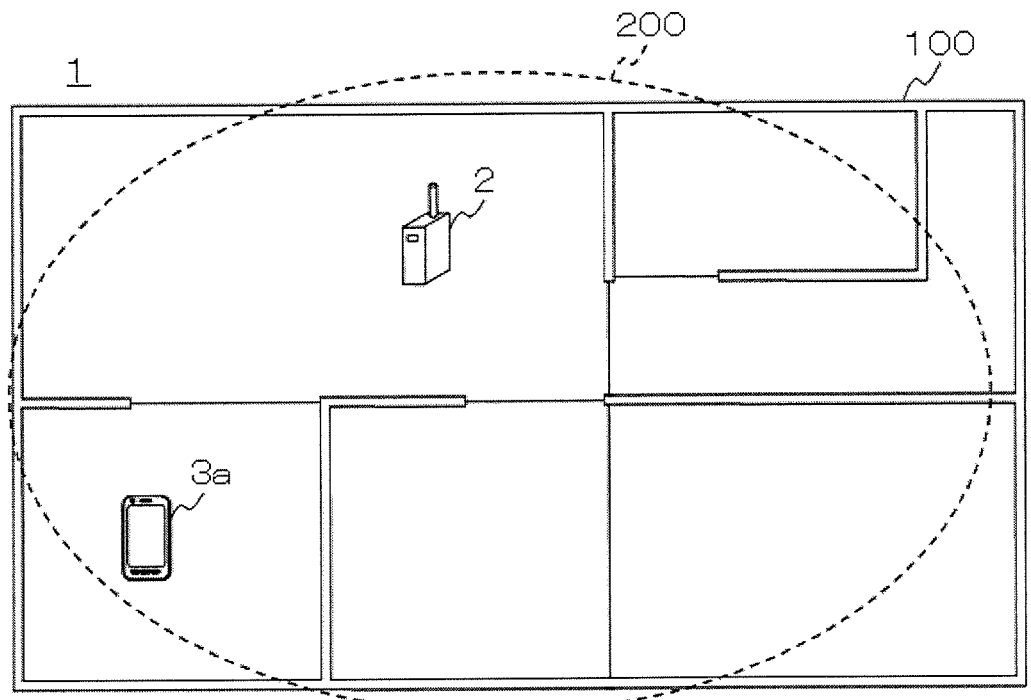
FIG. 1A and FIG. 1B are explanatory diagrams for describing an example of a coverage area control operation.
Figure 1B:
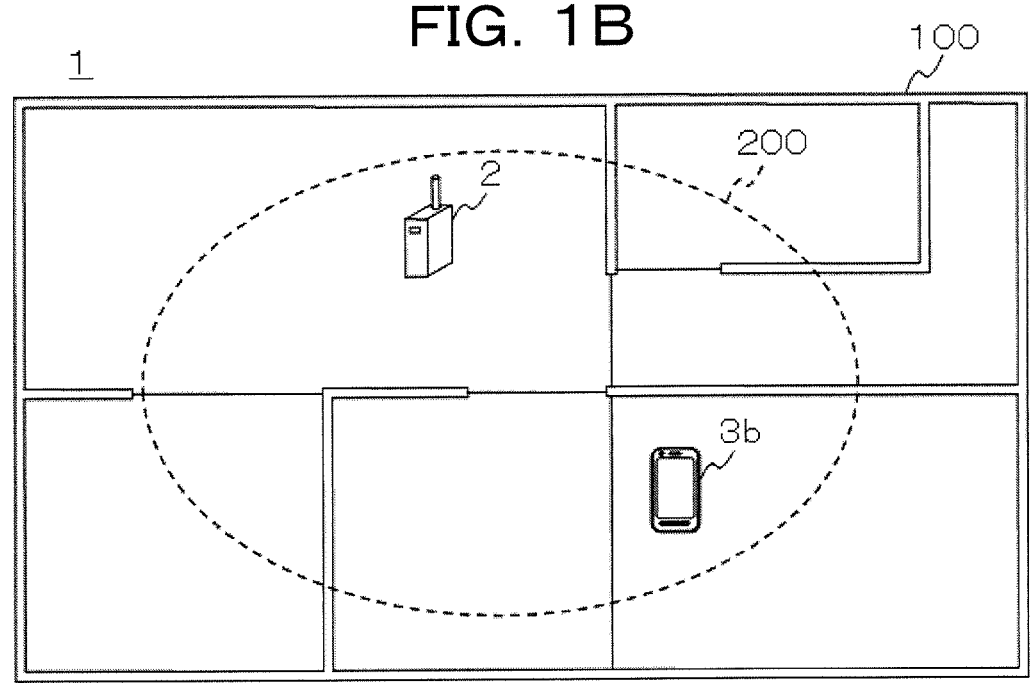

FIG. 1A and FIG. 1B are explanatory diagrams for describing an example of a coverage area control operation. A communication system 1 is provided with a femto base station apparatus 2 and mobile station apparatuses 3a and 3b which are arranged in a premise 100. A mobile station is an example of a wireless communication apparatus. In the following description and drawings, the base station apparatus and the mobile station apparatus may be referred to as "base station" and "mobile station", respectively. The mobile stations 3a and 3b may also be collectively referred to as "mobile station 3".

In the following description, an exemplification of a case in which the base station 2 is a femto base station is used. This exemplification is not intended to limit the application of the base station described in the present specification only to the femto base station. The base station described in the present specification can widely be applied to the base station that performs the control on the coverage in accordance with a wireless communication quality measured in the mobile station.

The femto base station 2 is a wireless communication apparatus that is wirelessly connected to the mobile station 3 to perform a wireless communication. A broken line 200 represents a femto cell corresponding to a wireless communication zone of the femto base station 2. The femto base station 2 can provide various services such as a voice communication and a video distribution to the mobile station 3 in the femto cell 200. The femto base station 2 can transmit and receive various pieces of information with a host node apparatus such as a Home eNodeB Gateway (HeNB-GW) via a wired network using an optical transmission or the like.

Here, a case is supposed in which the femto base station 2 is operated in a closed access mode where the connectable mobile station 3 is restricted. A group of the connectable mobile stations 3 is referred to as closed subscriber group (CSG). In the following description, the mobile station of the CSG member may be referred to as "CSG mobile station". In addition, the mobile station positioned within the zone of the macro cell may be referred to as "macro mobile station".

The femto base station 2 is installed in the cover area of the macro base station, and when femto base station 2 and the macro base station use a same frequency band, the interference between the cells may be generated. For example, the macro mobile station may be positioned in the vicinity of the cover area of the femto base station 2 operating in the closed access mode. The macro mobile station that is not the CSG member receives a strong interference from the femto base station 2. For that reason, the femto base station 2 adjusts the transmission power to such an extent that the CSG mobile station 3a satisfies a desired signal quality and controls the coverage area so as not to provide the unwanted interference to the macro mobile station.

In a case where a propagation loss between the CSG mobile station 3a and the femto base station 2 is high as in FIG. 1A, the femto base station 2 sets the transmission power to be high so as to maintain the wide coverage area. In a case where the propagation loss of the CSG mobile station 3b and the femto base station 2 is low as in FIG. 1B, the femto base station 2 adjusts the transmission power to such an extent that the connected CSG mobile station 3b satisfies the desired signal quality so as to narrow down the coverage area. For this reason, the unwanted interference to the neighboring cell is suppressed.

In some of the mobile phone systems, the mobile station periodically feeds back a reception quality of a downlink signal such as the reception SIR to the base station. The base station can adjust the transmission power of the base station based on the reception quality in the mobile station. For example, the femto base station 2 stores the reception SIRs reported from all the connected CSG mobile stations 3a, 3b, . . . for a certain period of time and determines the transmission power from a cumulative distribution of the reception SIRs.

Figure 2:
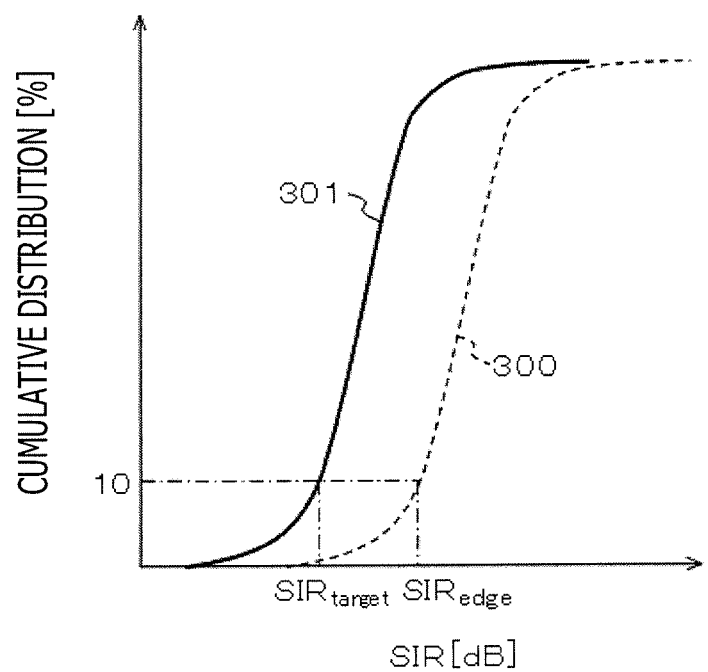
FIG. 2 is an explanatory diagram for describing an example of a cumulative distribution of a reception signal-to-interference ratio (SIR) of a mobile station apparatus.
Figure 3A:
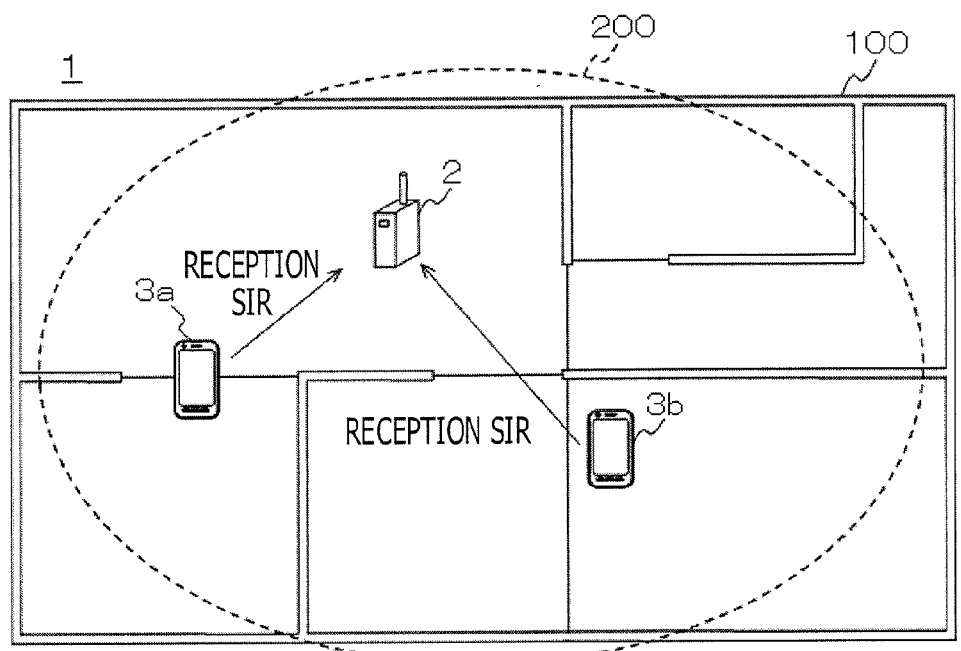
FIG. 3A and FIG. 3B are schematic diagrams of a coverage area at mutually different times.

FIG. 2 is an explanatory diagram for describing an example of the cumulative distribution of the reception SIRs in the mobile station 3. A broken line 300 represents a cumulative distribution of the reception SIRs measured in the mobile stations 3a, 3b, . . . at a certain time t. It is supposed that the transmission power of the femto base station 2 at the time t is TxPow[t]. FIG. 3A is a schematic diagram of a coverage area where the transmission power at the time t is in accordance with TxPow[t].

The cumulative distribution of the reception SIRs represents a probability where the reception SIRs in the connected mobile stations 3a, 3b, . . . are lower than or equal to that value and represents that the connected mobile stations 3a, 3b, . . . are positioned to be closer to a cell edge as the value of cumulative distribution is lower. For example, $SIR_{edge}$, an SIR at the cell edge, is set as the SIR that corresponds to a given value of 10% of the cumulative distribution. This given value is not limited to "10%" and can arbitrarily be selected by a communication service operator or a vender of the base station apparatus.

Since the connected mobile stations 3a, 3b, . . . are at positions relatively close to the femto base station 2 at the time t, the $SIR_{edge}$ measured at the time t is higher than a target $SIR_{target}$ corresponding to a target value of the SIR at the cell edge.

In view of the above, the femto base station 2 corrects the transmission power TxPow[t] during a period t by a difference between the cell edge $SIR_{edge}$ and the target $SIR_{target}$ in accordance with the following expression (1) and determines a transmission power TxPow[t+1] at a time t+1.

$$TxPow[t+1]=TxPow[t]+(SIR_{target}-SIR_{edge}) \qquad (1)$$

Figure 3B:
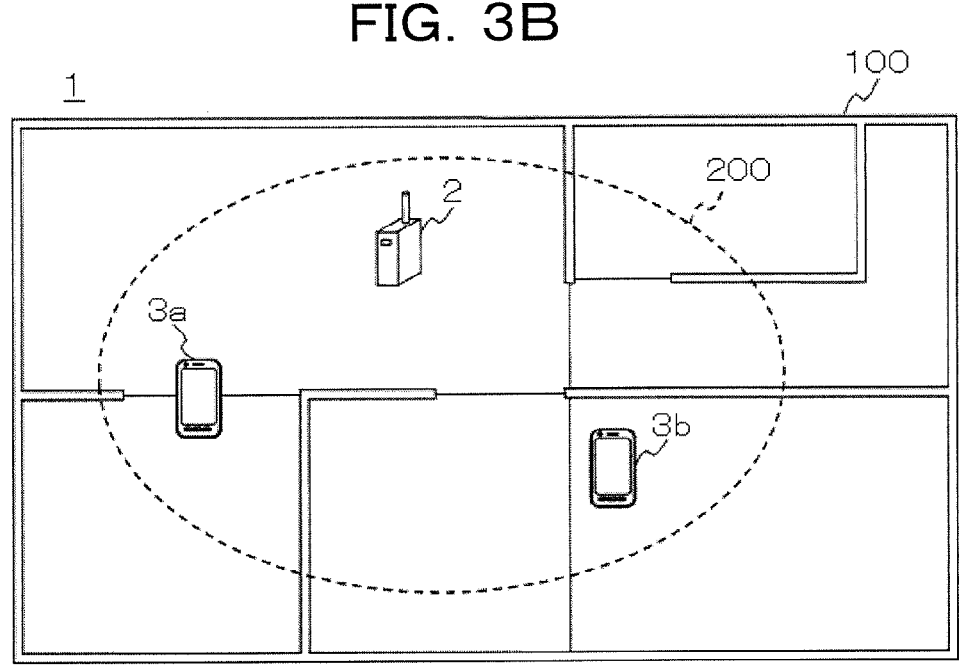

As a result, the coverage area is reduced as illustrated in FIG. 3B. The cumulative distribution of the reception SIRs measured at the time t+1 is closer to the distribution where the SIR at the given value of 10% is the target $SIR_{target}$ as represented by a solid line 301 of FIG. 2.

Figure 4:
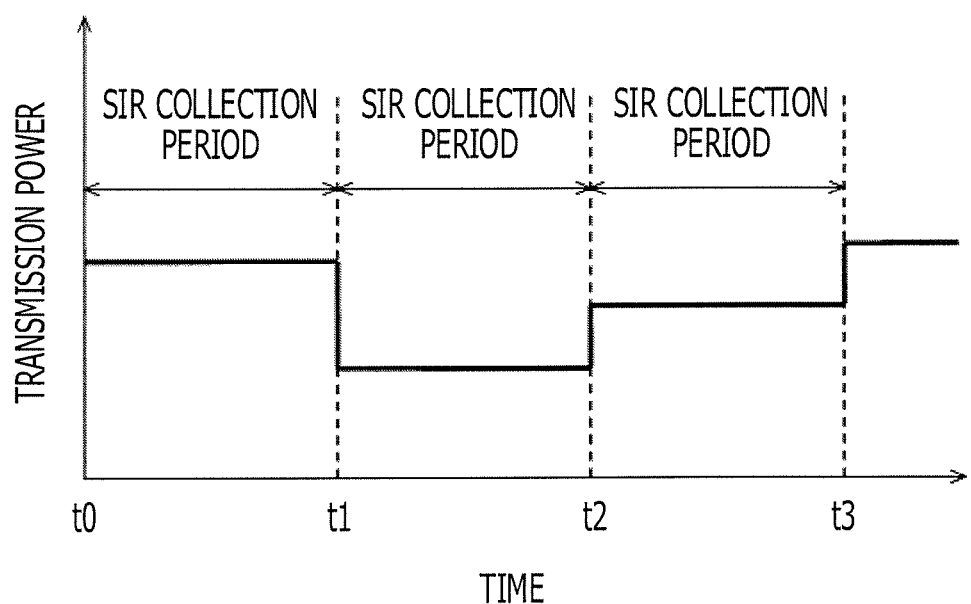
FIG. 4 is an explanatory diagram for describing an example of a relationship between an SIR collection period and a coverage area control cycle.

FIG. 4 is an explanatory diagram for describing an example of a relationship between the collection period for the SIR and the coverage area control cycle. In a case where the number of the reception SIRs reported from the mobile station 3 over a certain collection period are subjected to statistical processing to calculate a correction value ($SIR_{target}-SIR_{edge}$), the transmission power is updated at a cycle more than or equal to at least the collection period for the reception SIR used for the statistical processing. This is because, if the transmission power is changed in midcourse of the collection period, the distribution of the reception SIRs fluctuates, and the cumulative distribution of the reception SIRs at the same condition is not obtained. For example, in FIG. 4, the transmission power is updated at a same cycle as the collection period for the reception SIR at the times t0, t1, t2, and t3.

According to the system of performing the coverage control based on the amount of statistical of the reception $SIR_{edge}$ as described above, the coverage area control speed is limited by the collection period for the amount of the reception SIRs used for the statistical processing. According to the following embodiment, a new system with which the coverage area control speed can be improved is provided.

2. First Embodiment

Figure 5:
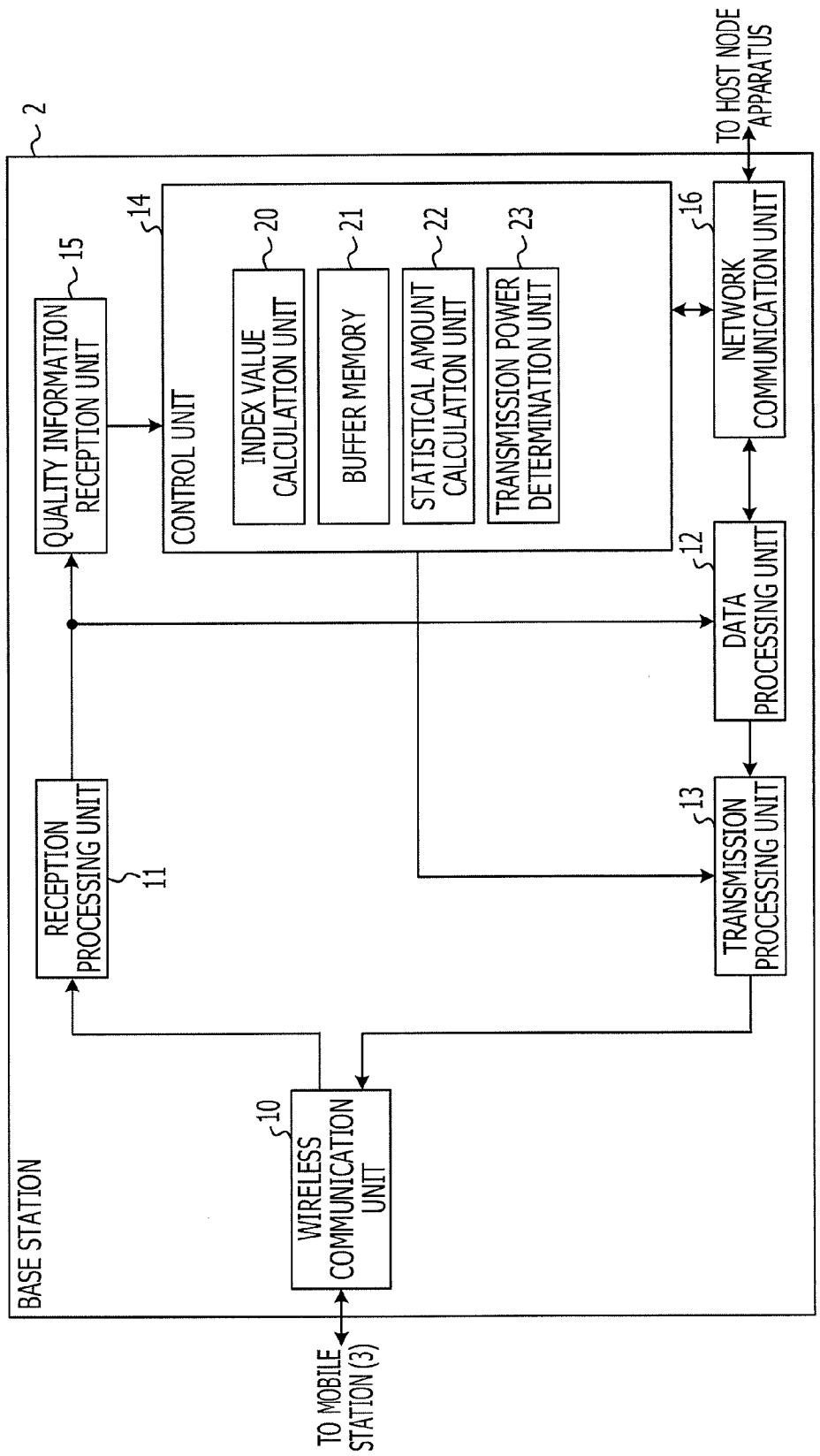
FIG. 5 is a functional configuration diagram of a first example of a femto base station apparatus.

Hereinafter, an embodiment will be described with reference to the accompanying drawings. FIG. 5 is a functional configuration diagram of a first example of the femto base station 2. The femto base station 2 is provided with a wireless communication unit 10, a reception processing unit 11, a data processing unit 12, a transmission processing unit 13, a control unit 14, a quality information reception unit 15, and a network communication unit 16.

The wireless communication unit 10 is configured to receive a wireless signal in a wireless bandwidth which has been received by an antenna and converts the wireless signal into a reception signal in a baseband bandwidth. The reception processing unit 11 is configured to perform demodulation and decode processing of the reception signal. The reception signal from the mobile station 3 positioned in a serving cell 4a may include user data and wireless quality information. The wireless quality information may include, for example, the SIR measured in the mobile station 3.

The reception processing unit 11 outputs the user data to the data processing unit 12 and outputs the wireless quality information to the quality information reception unit 15. The data processing unit 12 transmits the user data to the host node apparatus connected to a core network. The data processing unit 12 also receives the user data from the host node apparatus. The data processing unit 12 outputs downlink control information including uplink allocation information and the like and the user data to the transmission processing unit 13 as the downlink signals.

The transmission processing unit 13 is configured to receive the allocation information of the downlink wireless resources allocated to the mobile station 3 from the control unit 14. The transmission processing unit 13 encodes and modulates the downlink signal received from the data processing unit 12. The transmission processing unit 13 generates a baseband signal where the downlink signal after the modulation is mapped in a frequency bandwidth specified by the allocation information and outputs the baseband signal to the wireless communication unit 10 at a transmission time specified by the allocation information. The wireless communication unit 10 converts the baseband signal into a signal in a wireless bandwidth and then transmits the signal via the antenna. The quality information reception unit 15 is configured to input the wireless quality information to the control unit 14 that has been input from the reception processing unit 11. The network communication unit 16 is configured to perform communication processing with the host node apparatus via a wired network.

The control unit 14 determines wireless resources to be allocated to the downlink communication and the uplink communication between the femto base station 2 and the mobile station 3. The control unit 14 outputs the allocation information of the downlink wireless resource to the transmission processing unit 13. The control unit 14 also performs a control of increasing and decreasing the transmission power of the femto base station 2 based on the wireless quality information.

The control unit 14 includes an index value calculation unit 20, a buffer memory 21, a statistical amount calculation unit 22, and a transmission power determination unit 23. The index value calculation unit 20 is configured to calculate each index value indicating a difference (TxPow−the reception SIR) between the reception SIR in the mobile station 3 and the transmission power TxPow of the femto base station 2. The index value calculation unit 20 according to the first embodiment may calculate the difference itself (TxPow−the reception SIR) between the reception SIR fed back from the mobile station 3 and the transmission power TxPow as the index value.

The index value calculation unit 20 calculates each difference (TxPow−SIR) with regard to all or a part of the mobile stations 3 connected to the femto base station 2 to be stored in the buffer memory 21. As an exemplification, a case is supposed in which the index value calculation unit 20 calculates the difference (TxPow−the reception SIR#i) for every M mobile stations 3#i (i is an integer of 1 to M). The reception SIR#i corresponds to the reception SIR in the mobile station 3#i.

In the following description, a set composed of M differences (TxPow−the reception SIR#i) calculated once for every mobile station 3#i (i is an integer of 1 to M, and M is a natural number) may be referred to as batch difference data. N pieces of the batch difference data obtained by repeating the collection of the batch difference data by N times may be referred to as the N-batch difference data (N is a natural number higher than or equal to 2).

Herein, when a propagation loss of the downlink between the femto base station 2 and the mobile station 3 is denoted by PL and an interference from another cell observed at the mobile station 3 is denoted by I, the reception SIR is obtained by the following expression (2) in dB.

$$\text{The reception } SIR = TxPow - PL - I \quad (2)$$

When the expression (2) is transformed, the following expression (3) is obtained. That is, the difference (TxPow−the reception SIR) between the reception SIR and the transmission power is equal to the sum of the propagation loss PL and the interference power I (PL+I).

$$TxPow - \text{the reception } SIR = PL + I \quad (3)$$

Figure 6:
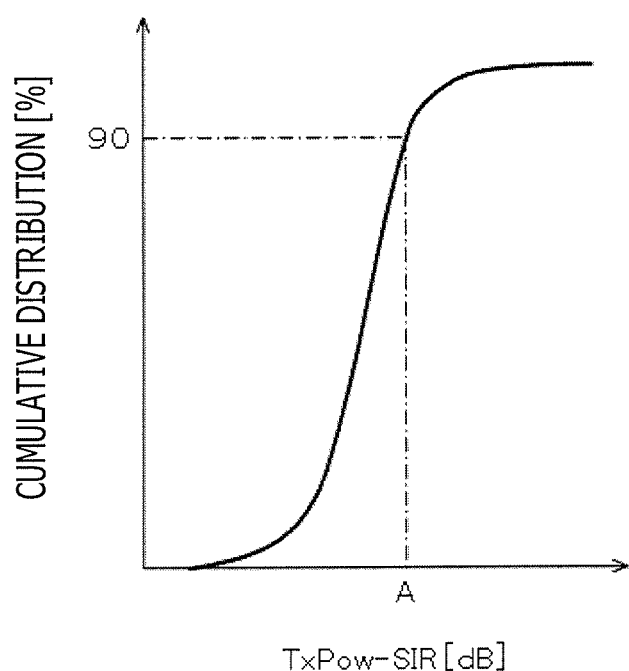
FIG. 6 is an explanatory diagram for describing an example of a cumulative distribution of a difference between transmission power and the reception SIR.

The statistical amount calculation unit 22 calculates the cumulative distribution of the differences (TxPow−the reception SIR) from the N-batch difference data calculated based on the reception SIRs received during the collection period of the given length as the cumulative distribution of the sum of the propagation loss and the interference power (PL+I). FIG. 6 is an explanatory diagram for describing an example of the cumulative distribution of the difference between the transmission power and the reception SIR.

The statistical amount calculation unit 22 determines a value A of the difference (TxPow−the reception SIR) corresponding to the given value of 90% of the cumulative distribution corresponding to the mobile station 3 at the cell edge as the sum of the propagation loss at the cell edge and the interference power (PL+I). The given value is not limited to "90%" and may arbitrarily be selected by a communication service operator or a vender of the base station apparatus.

When the above-mentioned value A is assigned to PL+I in the above-mentioned expression (3) and $SIR_{target}$ is assigned to the reception SIR, the following calculation expression (4) is obtained. The transmission power determination unit 23 determines the transmission power TxPow of the femto base station 2 based on the following calculation expression (4). The transmission power determination unit 23 changes the coverage area by changing the transmission power of the femto base station 2 to the value TxPow.

$$TxPow = SIR_{target} + A \quad (4)$$

As described above, the statistical amount A to be used for the control of the transmission power TxPow is determined based on the cumulative distribution of the sum of the propagation loss and the interference power (PL+I). The values of the propagation loss and the interference power do not rely on the transmission power TxPow.

Therefore, even when the transmission power is changed during the collection period where the N-batch difference data used for the generation of the cumulative distribution by the statistical amount calculation unit 22 is collected, the change in the transmission power does not affect the distribution of the sum of the propagation loss and the interference power. Accordingly, whenever the coverage control is conducted by changing the transmission power, the change in the transmission power does not affect the value of the statistical amount A.

For this reason, the statistical amount calculation unit 22 may calculate the statistical amount A in a cycle shorter than the collection period for the difference data used for the generation of the cumulative distribution. The transmission power determination unit 23 may also update the transmission power in a cycle shorter than the collection period for the difference data used for the generation of the cumulative distribution.

Figure 7:
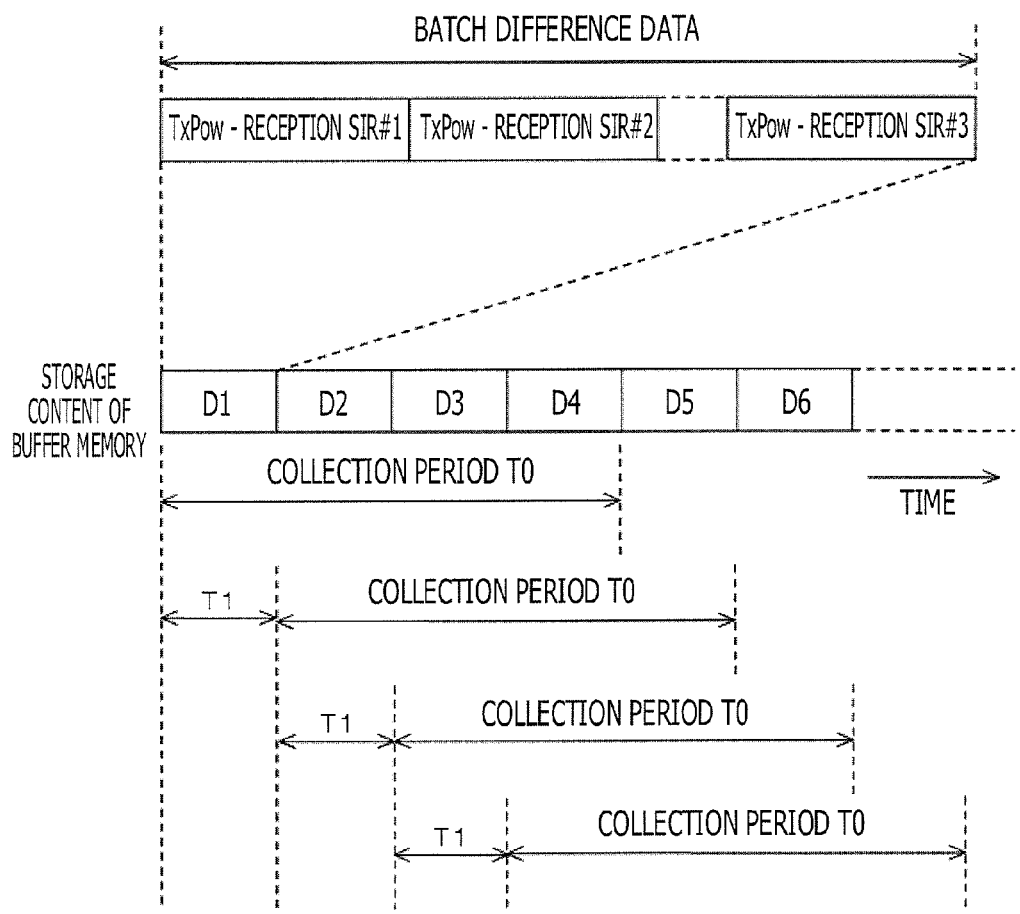
FIG. 7 is an explanatory diagram for describing an example of a relationship between a collection period for the difference between the transmission power and the reception SIR, and the coverage area control cycle.

FIG. 7 is an explanatory diagram for describing an example of a relationship between the collection period for the difference between the transmission power and the reception SIR, and the coverage area control cycle. FIG. 7 corresponds to a case in which the pieces of the batch difference data for four times are used for the generation of the cumulative distribution (the case of N=4). The buffer memory 21 sequentially stores the batch difference data D1, D2, D3 .... Each of the difference data D1, D2, D3 ... contains M differences (TxPow−the reception SIR#i) (i=1 to M).

The statistical amount calculation unit 22 generates the cumulative distribution based on the difference data D1 to D4 calculated based on the reception SIRs received in a collection period T0 and calculates the statistical amount A. The transmission power determination unit 23 changes the transmission power of the femto base station 2 to a value determined based on the statistical amount A.

After a period T1 that is shorter than the collection period T0 elapses, the statistical amount calculation unit 22 generates the cumulative distribution based on the difference data D2 to D5 calculated based on the reception SIRs received in the collection period T0 and calculates the statistical amount A. The transmission power determination unit 23 changes the transmission power of the femto base station 2 to a value determined based on the statistical amount A. The period T1 may be, for example, a cycle during which the batch difference data is collected.

After the period T1 further elapses, the statistical amount calculation unit 22 generates the cumulative distribution based on the difference data D3 to D6 calculated based on the reception SIRs received in the collection period T0 and calculates the statistical amount A. The transmission power determination unit 23 changes the transmission power of the femto base station 2 to a value determined based on the statistical amount A.

Since the transmission power is calculated in accordance with the statistical amount calculated from the cumulative distribution of the difference (TxPow−the reception SIR) between the reception SIR and the transmission power in the above-mentioned manner, it is possible to set the update cycle of the transmission power to be shorter than the collection period for the data used for the generation of the cumulative distribution. As a result, it is possible to improve the update cycle of the transmission power.

Figure 8:
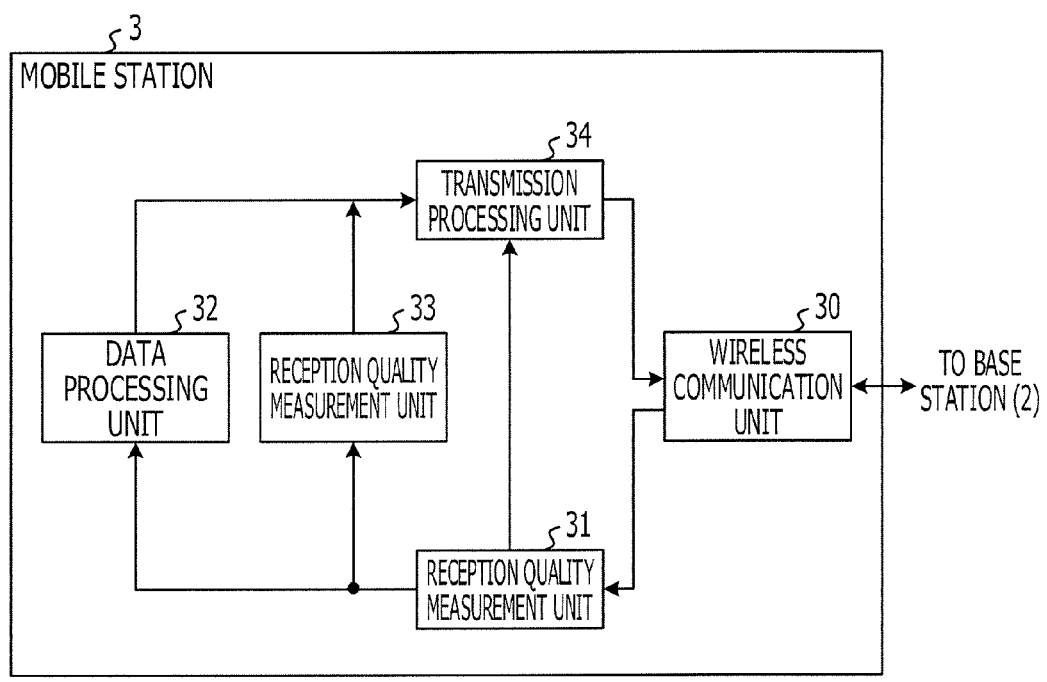
FIG. 8 is a functional configuration diagram of an example of the mobile station apparatus.

FIG. 8 is a functional configuration diagram of an example of the mobile station 3. The mobile station 3 is provided with a wireless communication unit 30, a reception processing unit 31, a data processing unit 32, a reception quality measurement unit 33, and a transmission processing unit 34. The wireless communication unit 30 is configured to receive a wireless signal in a wireless bandwidth which has been received by the antenna to be converted to a reception signal in the baseband bandwidth.

The reception processing unit 31 is configured to perform demodulation and decode processing of the reception signal. The reception signal from the femto base station 2 may include the user data and a downlink control signal. The reception processing unit 31 outputs the user data to the data processing unit 32 and outputs the downlink control signal to the transmission processing unit 34.

The data processing unit 32 is configured to perform processing of a higher-level layer such as an application layer on the user data received from the reception processing unit 31. The data processing unit 32 also outputs user data of an uplink generated through the processing of the higher-level layer to the transmission processing unit 34.

The reception quality measurement unit 33 is configured to measure a reception quality at a time when the transmission signal from the femto base station 2 is received by the mobile station 3. The reception quality measurement unit 33 generates wireless quality information indicating the measurement result and outputs the wireless quality information to the transmission processing unit 34. As described above, this wireless quality information may be, for example, the SIR.

The transmission processing unit 34 is configured to obtain the allocation information of the wireless resources of the uplink allocated to the mobile station 3 from the downlink control signal. The transmission processing unit 34 receives the user data and the wireless quality information from the data processing unit 32 and the reception quality measurement unit 33 as the uplink signals.

The transmission processing unit 34 encodes and modulates each of the received user data and the received wireless quality information. The transmission processing unit 34 generates a baseband signal where the uplink signal after the modulation is mapped on a frequency band of a wireless resource specified by the allocation information and outputs the baseband signal to the wireless communication unit 30 at a transmission time specified by the allocation information. The wireless communication unit 30 converts the baseband signal into the signal in the wireless bandwidth and thereafter transmits the signal via the antenna.

Figure 9:
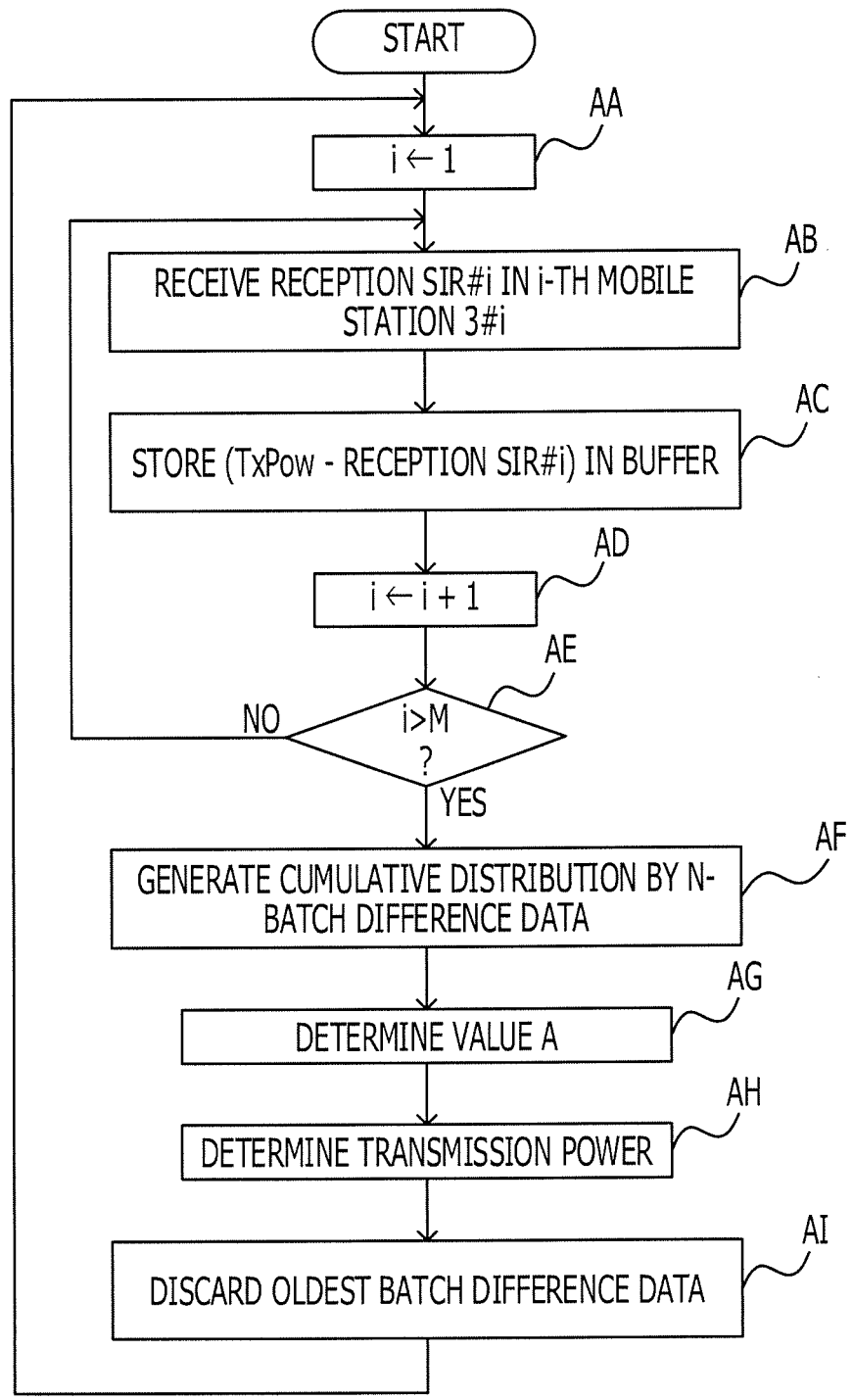
FIG. 9 is an explanatory diagram for describing a first example of a coverage area control operation.

Hereinafter, the operation by the femto base station 2 will be described. FIG. 9 is an explanatory diagram for describing a first example of the control operation of the coverage area. In operation AA, the control unit 14 assigns a value "1" to a variable i identifying the i-th mobile station 3#i.

In operation AB, the quality information reception unit 15 receives the reception SIR#i of the mobile station 3#i. In operation AC, the index value calculation unit 20 stores the difference (TxPow−the reception SIR#i) in the buffer memory 21. In operation AD, the control unit 14 increases the value of the variable i by 1.

In operation AE, the control unit 14 determines whether or not the variable i is higher than the number M of the mobile stations of the calculation target of the difference (TxPow−the reception SIR#i). In a case where the variable i is lower than or equal to the number M of the mobile stations (operation AE: N), the operation returns to operation AB. While the operations AB to AE are repeated by M times, the batch difference data is stored in the buffer memory 21.

In a case where the variable i is higher than the number M of the mobile stations (operation AE: Y), the operation proceeds to operation AF. In operation AF, the statistical amount calculation unit 22 generates the cumulative distribution of the difference (TxPow−the reception SIR) from the N-batch difference data. In operation AG, the statistical amount calculation unit 22 determines the statistical amount A from the cumulative distribution.

In operation AH, the transmission power determination unit 23 calculates the transmission power TxPow of the femto base station 2 and changes the transmission power of the femto base station 2 to the value TxPow. In operation AI, the control unit 14 discards the oldest batch difference data stored in the buffer memory 21. After that, the operation returns to operation AA. The discard of the batch difference data in operation AI may be carried out at any timing in a period after the cumulative distribution is generated in operation AF until the transmission power is determined in operation AH.

3. Effects of the Embodiment

According to the present embodiment, irrespective of the data amount of the reception quality information of the mobile station used for the statistical processing to calculate the transmission power, it is possible to shorten the update cycle of the transmission power. For this reason, it is possible to improve the coverage control speed without a decrease in the measurement accuracy caused by a decrease in the population of the data of the reception quality used for the statistical processing.

4. Second Embodiment

Figure 10A:
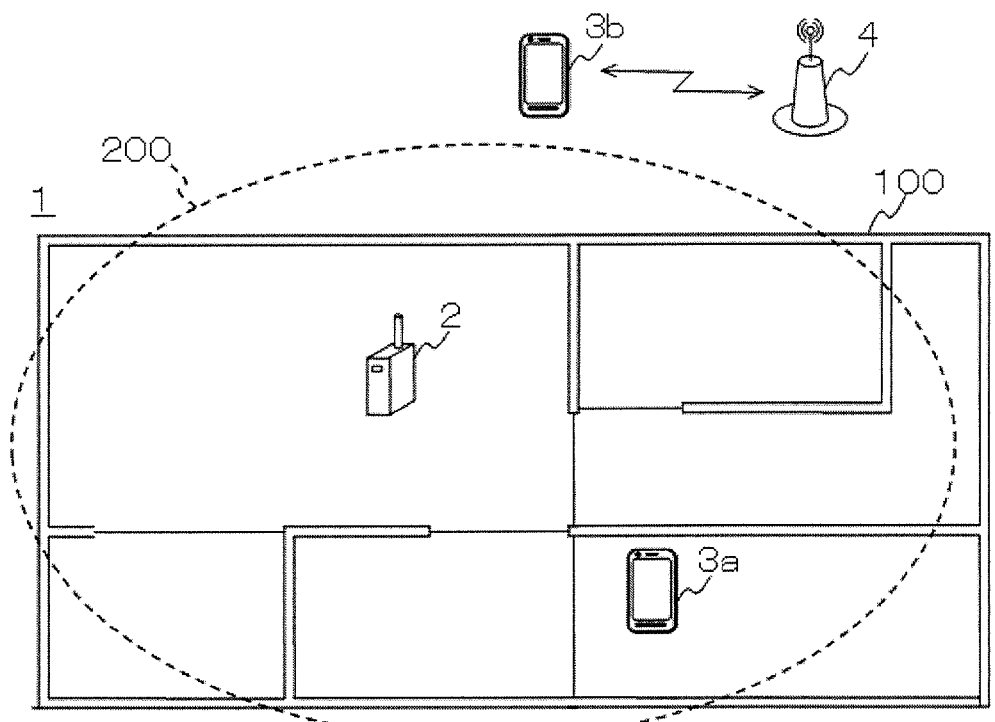
FIG. 10A and FIG. 10B are explanatory diagrams for describing an example of an interference control operation.
Figure 10B:
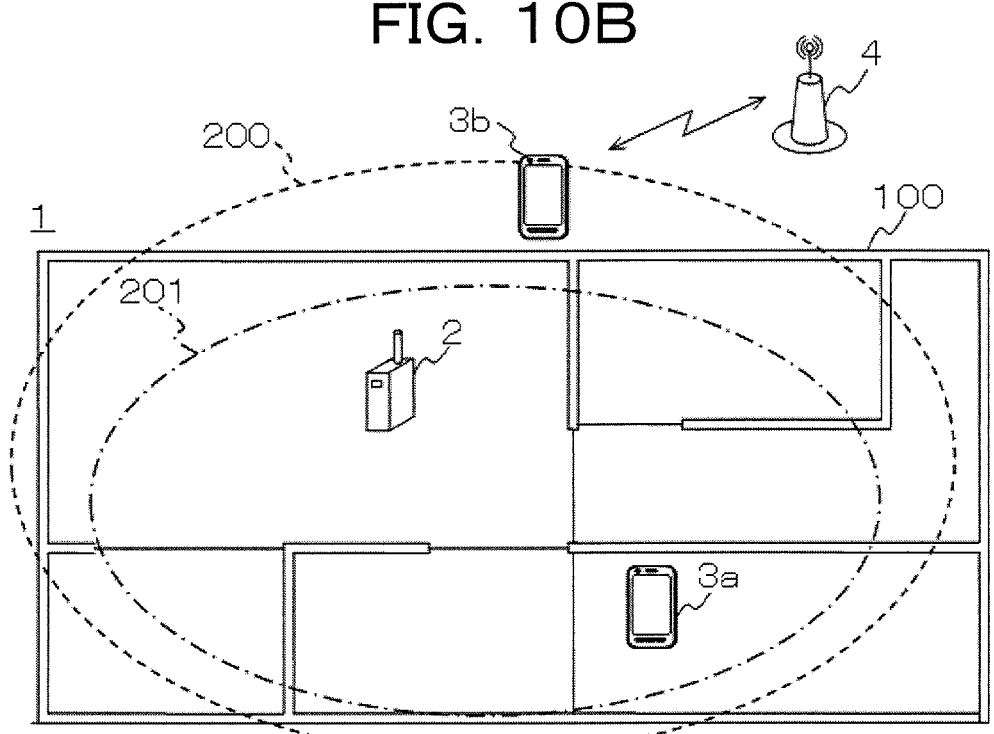

The femto base station 2 according to a second embodiment performs an interference control operation of reducing the coverage area when an interference to a mobile station connected with the other base station is detected. FIG. 10A and FIG. 10B are explanatory diagrams for describing an example of the interference control operation. In a state illustrated in FIG. 10A, the macro mobile station 3b connected to the macro base station 4 does not receive a large interference from the femto base station 2, and the femto base station 2 and the macro base station 4 do not interfere with each other. For this reason, the femto base station 2 maintains a relatively high transmission power $TxPow_{normal}$ and makes a range of the coverage area 200 relatively wide.

As illustrated in FIG. 10B, when the macro mobile station 3b receives a large interference in the coverage area 200 and the interference between the femto base station 2 and the macro base station 4 is generated, the femto base station 2 performs the interference control operation. In the interference control operation, the femto base station 2 decreases the transmission power to $TxPow_{IM}$ that is lower than $TXPow_{normal}$ by $\Delta$ and reduces the coverage area to a range 201.

Figure 11:
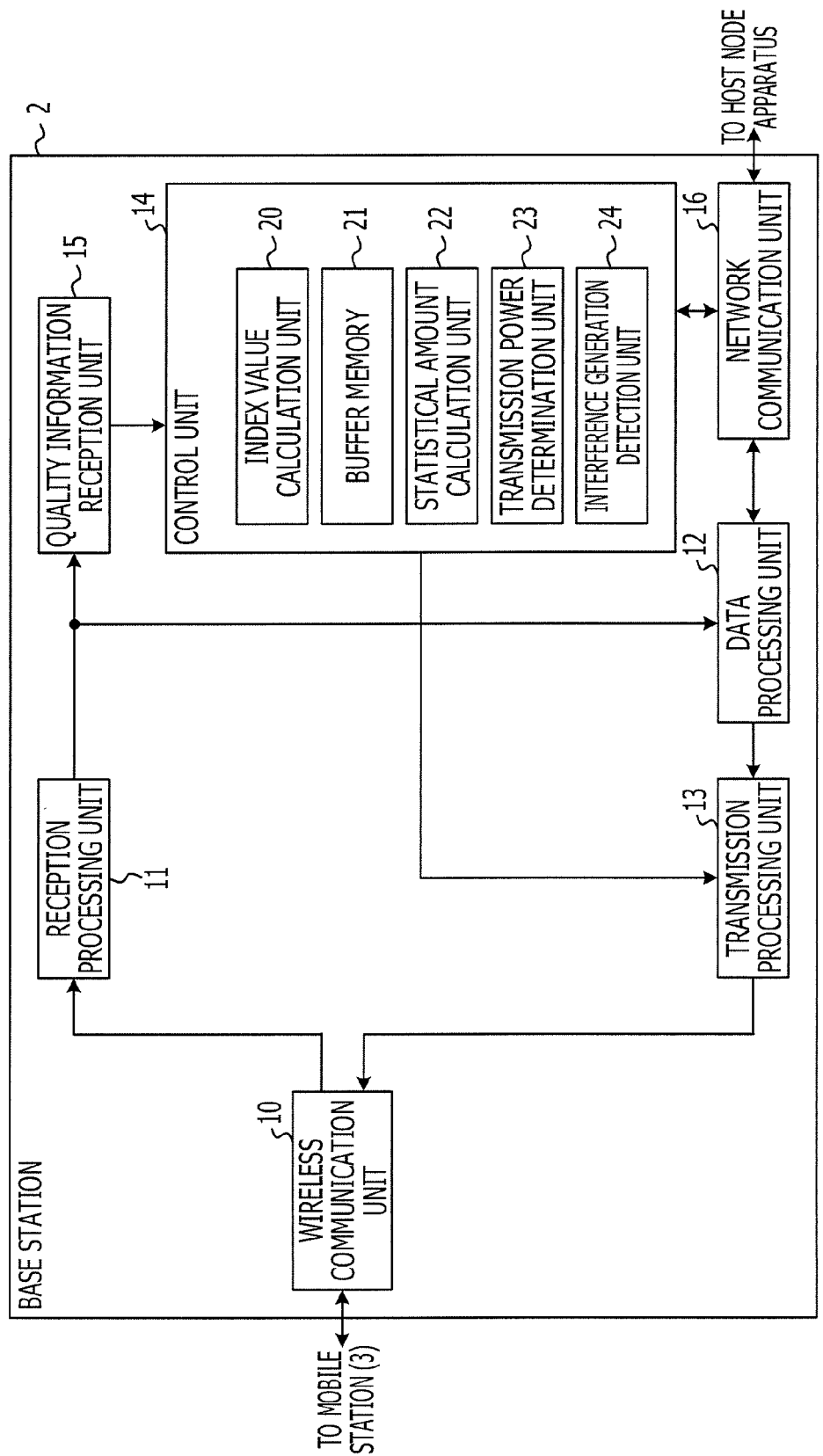
FIG. 11 is a functional configuration diagram of a second example of the femto base station apparatus.

FIG. 11 is a functional configuration diagram of a second example of the femto base station 2. Components that are the same as those illustrated in FIG. 5 are assigned with the same reference signs as those used in FIG. 5, and a description of the same function will be omitted. The control unit 14 is provided with an interference generation detection unit 24.

The interference generation detection unit 24 detects the generation of the interference between the femto base station 2 and the other base station. The transmission power determination unit 23 performs the interference control operation of decreasing the transmission power of the femto base station 2 by $\Delta$ in a case where the generation of the interference between the femto base station 2 and the other base station is detected.

The interference generation detection unit 24 may directly detect a degree of a radio interference received from the other base station to detect the interference between the femto base station 2 and the other base station. The interference generation detection unit 24 may receive a message related to the radio interference which is transmitted from the mobile station 3 that performs the wireless communication with the femto base station 2 or the other base station to detect the radio interference between the femto base station 2 and the other base station. That is, it suffices if the interference generation detection unit 24 can detect the radio interference through any method.

Here, the reception SIR of the CSG mobile station 3a in a state in which the interference control is not executed is denoted by the reception $SIR_{normal}$. The reception SIR of the CSG mobile station 3a in a state in which the interference control is executed is denoted by the reception $SIR_{IM}$.

The value of the difference data accumulated in the buffer memory 21 in a state in which the interference control is not executed is $(TxPow_{normal}-\text{the reception } SIR_{normal})=PL+I$. On the other hand, the value of the difference data accumulated in the buffer memory 21 in a state in which the interference control is executed is $(TxPow_{IM}-\text{the reception } SIR_{IM})$.

Herein, the value of the transmission power $TxPow_{IM}$ in a state in which the interference control is executed is $(TxPow_{normal}-\Delta)$. The value of the reception $SIR_{IM}$ in a state in which the interference control is executed is (the reception $SIR_{normal}-\Delta$). Therefore, the value of the difference data accumulated in the buffer memory 21 in a state in which the interference control is executed is $(TxPow_{normal}-\Delta-\text{the reception } SIR_{normal}+\Delta)=PL+I$. That is, the sum of the propagation loss and the interference power (PL+I) accumulated in the buffer memory 21 is not affected by an influence depending on the presence or absence of the execution of the interference control.

For this reason, the statistical amount calculation unit 22 can calculate the statistical amount A for realizing the target $SIR_{target}$ based on the cumulative distribution of the sum of the propagation loss and the interference power (PL+I) irrespective of the presence or absence of the execution of the interference control.

According to the present embodiment, when the generation of the interference between the femto base station 2 and the other base station is detected, the transmission power determination unit 23 can perform the interference control of decreasing the transmission power irrespective of whether or not the time is the collection period for the reception SIR used for the generation of the cumulative distribution of the difference (TxPow−the reception SIR).

Figure 12:
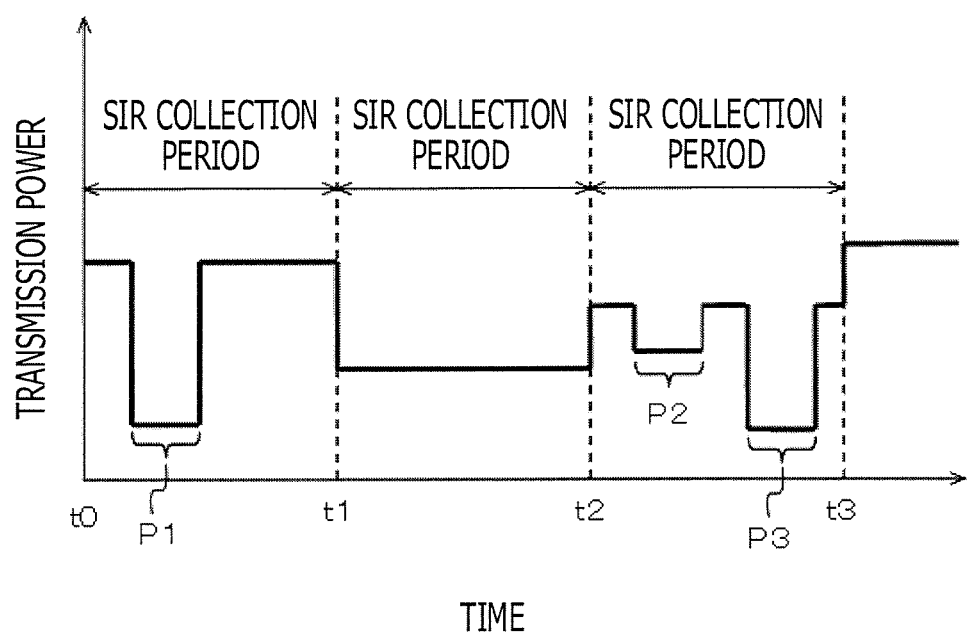
FIG. 12 is an explanatory diagram for describing an example of a relationship between the SIR collection period and an interference control execution period.

FIG. 12 is an explanatory diagram for describing an example of a relationship between the SIR collection period and an interference control execution period. The interference control of decreasing the transmission power is conducted in a period p1 that is a segment during the collection period t0 to t1 for the reception SIR. The interference control of decreasing the transmission power is also conducted in a period p2 and a period p3 which are segments during the collection period t2 to t3 for the reception SIR.

It is noted that also according to a third embodiment and a fourth embodiment which will be described below, the femto base station 2 may be provided with the interference generation detection unit 24. The transmission power determination unit 23 may perform the interference control of decreasing the transmission power irrespective of whether or not the time is the collection period for the reception SIR used for the generation of the cumulative distribution of the difference (TxPow−the reception SIR).

5. Third Embodiment

According to the third embodiment, the sum of the propagation loss PL and the interference power I (PL+I) is calculated as an index value indicating the difference (TxPow−the reception SIR) between the reception SIR and the transmission power of the femto base station 2. For this reason, the reception quality measurement unit 33 of the mobile station 3 measures a desired signal reception power RxPow in the mobile station 3 and an all reception power RxPowAll. The desired signal reception power RxPow can be calculated from a reception power of a reference symbol included in the transmission signal from the femto base station 2. The all reception power RxPowAll can be determined from a received signal strength indicator (RSSI).

The transmission processing unit 34 of the mobile station 3 transmits the wireless quality information including the desired signal reception power RxPow and the all reception power RxPowAll to the femto base station 2 via the wireless communication unit 30. The quality information reception unit 15 of the femto base station 2 inputs the desired signal reception power RxPow and the all reception power RxPowAll of each of the mobile stations 3 included in the received wireless quality information to the control unit 14.

The index value calculation unit 20 calculates the propagation loss PL in accordance with the transmission power TxPow and the desired signal reception power RxPow by the following expression (5). The index value calculation unit 20 calculates the interference power I from the desired signal reception power RxPow and the all reception power RxPowAll in accordance with the following expression (6).

The propagation loss $PL = TxPow - RxPow$     (5)

The interference power $I = RxPowAll - RxPow$     (6)

The index value calculation unit 20 calculates each sum of the propagation loss and the interference power (PL+I) with regard to all or a part of the mobile stations 3#i connected to the femto base station 2 to be stored in the buffer memory 21. Hereinafter, the propagation loss PL and the interference power I in the mobile station 3#i are respectively denoted by PL#i and I#i. In addition, a set composed of M pieces of the sums (PL#i+I#i) calculated once for every the mobile station 3#i may be referred to as batch sum data. N pieces of the batch sum data obtained by repeating the collection of the batch sum data by N times may be referred to as N-batch sum data.

The statistical amount calculation unit 22 calculates the cumulative distribution of the sum of the propagation loss and the interference power (PL+I) from the N-batch sum data calculated based on the desired signal reception power RxPow and the all reception power RxPowAll received in a collection cycle having a given length. The statistical amount calculation unit 22 determines a value A of the sum (PL+I) that corresponds to a given value of the cumulative distribution corresponding to the mobile station 3 at the cell edge as the sum of the propagation loss and the interference power (PL+I) at the cell edge.

The transmission power determination unit 23 determines the transmission power TxPow of the femto base station 2 based on the above-mentioned calculation expression (4). The transmission power determination unit 23 changes the coverage area by changing the transmission power of the femto base station 2 to the value TxPow.

Figure 13:
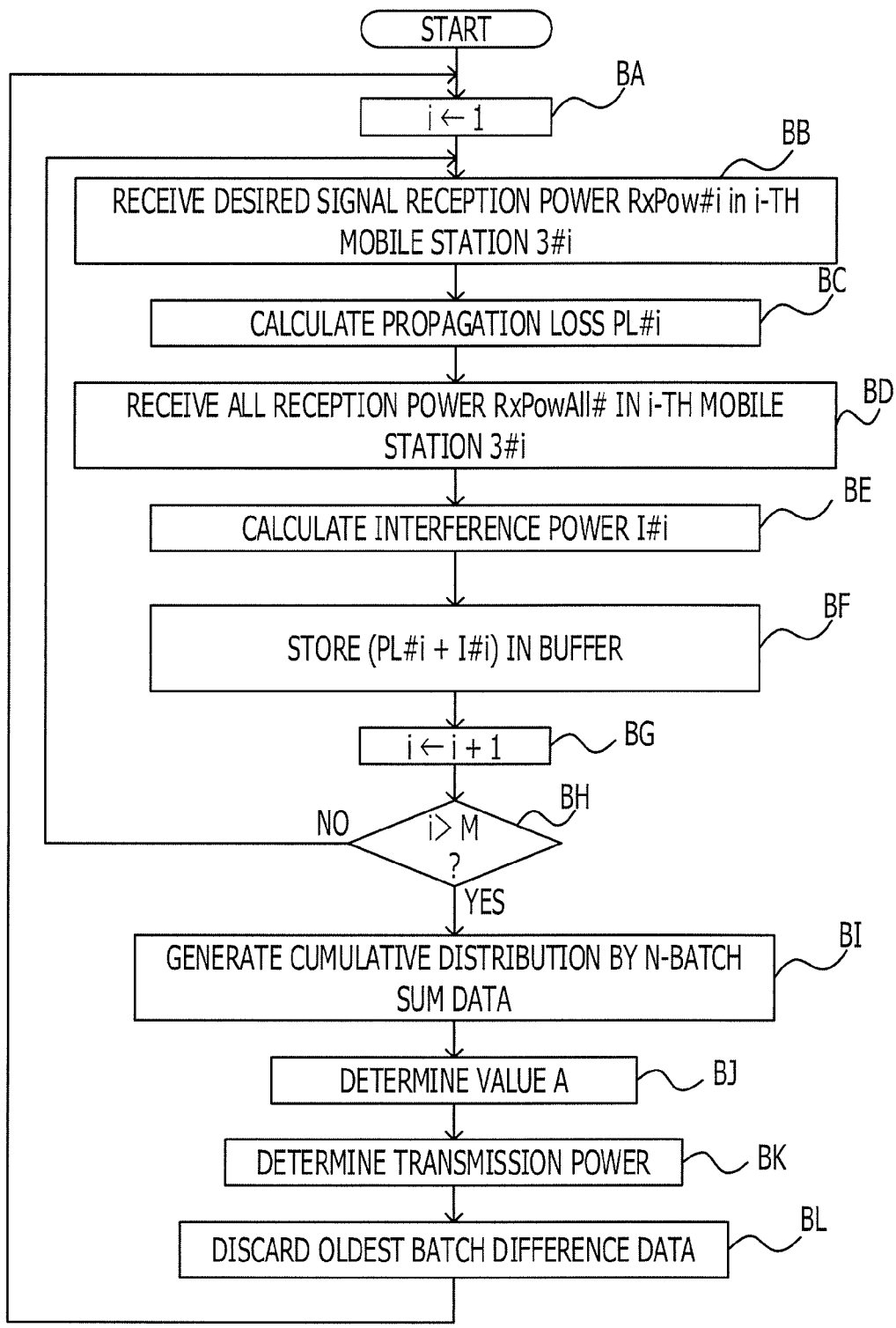
FIG. 13 is an explanatory diagram for describing a second example of the coverage area control operation.

FIG. 13 is an explanatory diagram for describing a second example of the control operation of the coverage area. In operation BA, the control unit 14 assigns the value "1" to the variable i for identifying the i-th mobile station 3#i.

In operation BB, the quality information reception unit 15 receives the desired signal reception power RxPow#i in the mobile station 3#i. In operation BC, the index value calculation unit 20 calculates the propagation loss PL#i in the mobile station 3#i. In operation BD, the quality information reception unit 15 receives the all reception power RxPowAll#i in the mobile station 3#i. In operation BE, the index value calculation unit 20 calculates the interference power I#i in the mobile station 3#i. The calculation of the propagation loss PL#i in operation BC may be conducted after operation BD and may also be conducted after operation BE.

In operation BF, the index value calculation unit 20 stores the sum (PL#i+I#i) in the buffer memory 21. In operation BG, the control unit 14 increases the value of the variable i by 1. In operation BH, the control unit 14 determines whether or not the variable i is higher than the number M of the mobile stations of the calculation target of the sum (PL#i+I#i). In a case where the variable i is lower than or equal to the number M of the mobile stations (operation BH: N), the operation returns to operation BB. Since operations BB to BH are repeated by M times, the batch sum data is stored in the buffer memory 21.

In a case where the variable i is higher than the number M of the mobile stations (operation BH: Y), the operation proceeds to operation BI. In operation BI, the statistical amount calculation unit 22 generates the cumulative distribution of the sum of the propagation loss and the interference power (PL+I) from the N-batch sum data. In operation BJ, the statistical amount calculation unit 22 determines the statistical amount A from the cumulative distribution.

In operation BK, the transmission power determination unit 23 calculates the transmission power TxPow of the femto base station 2 and changes the transmission power of the femto base station 2 to the value TxPow. In operation BL, the control unit 14 discards the oldest batch difference data stored in the buffer memory 21. After that, the operation returns to operation BA. The discard of the batch difference data in operation BL may be carried out at any timing in a period after the cumulative distribution is generated in operation BI until the transmission power is determined in operation BK.

According to the present embodiment too, it is possible to improve the coverage control speed without a decrease in the measurement accuracy caused by a decrease in the population of the data of the reception quality used for the statistical processing.

6. Fourth Embodiment

Figure 14:
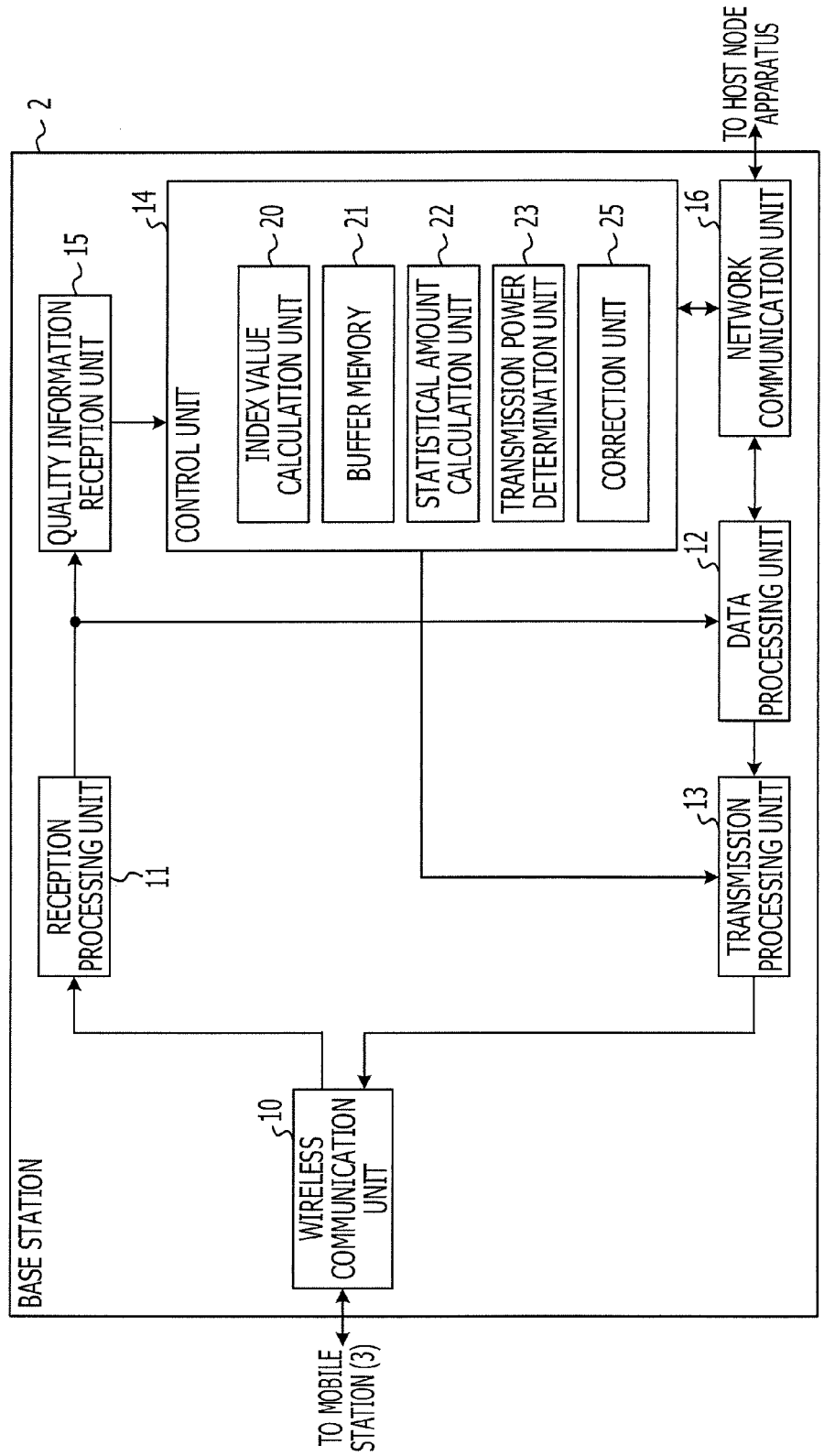
FIG. 14 is a functional configuration diagram of a third example of the femto base station apparatus.

FIG. 14 is a functional configuration diagram of a third example of the femto base station 2. Components that are the same as those illustrated in FIG. 5 are assigned with the same reference signs as those used in FIG. 5, and a description of the same function will be omitted. The control unit 14 is provided with a correction unit 25. The correction unit 25 corrects the value of $SIR_{target}$ of the above-mentioned calculation expression (4) in accordance with a gradient α at a given value "90%" of the cumulative distribution corresponding to the mobile station 3 at the cell edge in the cumulative distribution generated by the statistical amount calculation unit 22.

Figure 15:
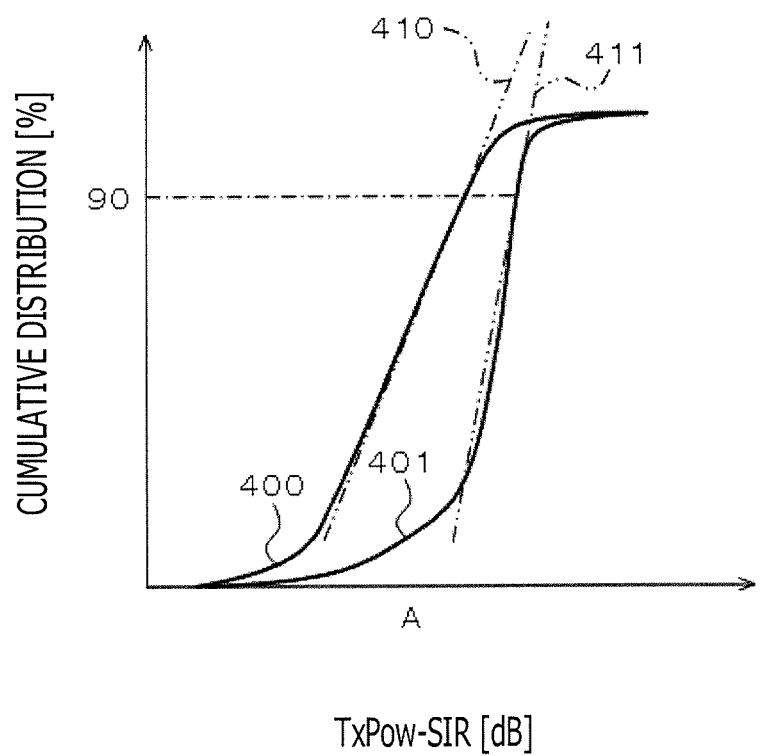
FIG. 15 is an explanatory diagram for describing an exemplification of a cumulative distribution of a difference between the transmission power and the reception SIR.

A shape of a cumulative distribution curve varies depending on the distribution of the mobile station 3 in the coverage area of the femto base station 2. FIG. 15 is an explanatory diagram for describing an exemplification of the cumulative distribution of the differences between the transmission power and the reception SIR. In a case where the mobile stations 3 are randomly distributed across the entire cell, a cumulative distribution increases relatively gently as represented by a solid line 400. On the other hand, in a case where the distribution has a bias and more mobile stations 3 exists in the vicinity of the cell edge, the gradient α is precipitous at a value equivalent to the cell edge as represented by a solid line 401.

In a case where the transmission power is determined by using the cumulative distribution of the difference (TxPow− the reception SIR) or the cumulative distribution of the sum (PL+I) in the above-mentioned manner, a dispersion state of the mobile stations 3 at the positions on the cell edge can roughly be grasped based on the gradient α at the value equivalent to the cell edge. For this reason, according to the third embodiment, a margin $\Delta_{margin}$ used for setting the target $SIR_{target}$ is adjusted by using this information. For example, the correction unit 25 sets the target $SIR_{target}$ in accordance with the following expression (7).

$$SIR_{target}=SIR_{min}+\Delta_{margin} \tag{7}$$

$SIR_{min}$ denotes, for example, a lower limit value of the permissible SIR. The value is, for example, a lower limit value of the SIR at which the mobile station 3 can perform the communication. The correction unit 25 adjusts the margin $\Delta_{margin}$ so that $\Delta_{margin}$ is decreased as the inclination α is increased and $\Delta_{margin}$ is increased as the inclination α is decreased. The transmission power determination unit 23 determines the transmission power TxPow of the femto base station 2 based on the following calculation expression (8).

$$TxPow=SIR_{min}+\Delta_{margin}+A \tag{8}$$

According to the present embodiment, it is possible to decrease the margin and decrease the transmission power in a case where the distribution of the mobile station 3 in the femto cell has a bias and more mobile stations exist in the vicinity of the cell edge.

7. Hardware Configuration

Figure 16:
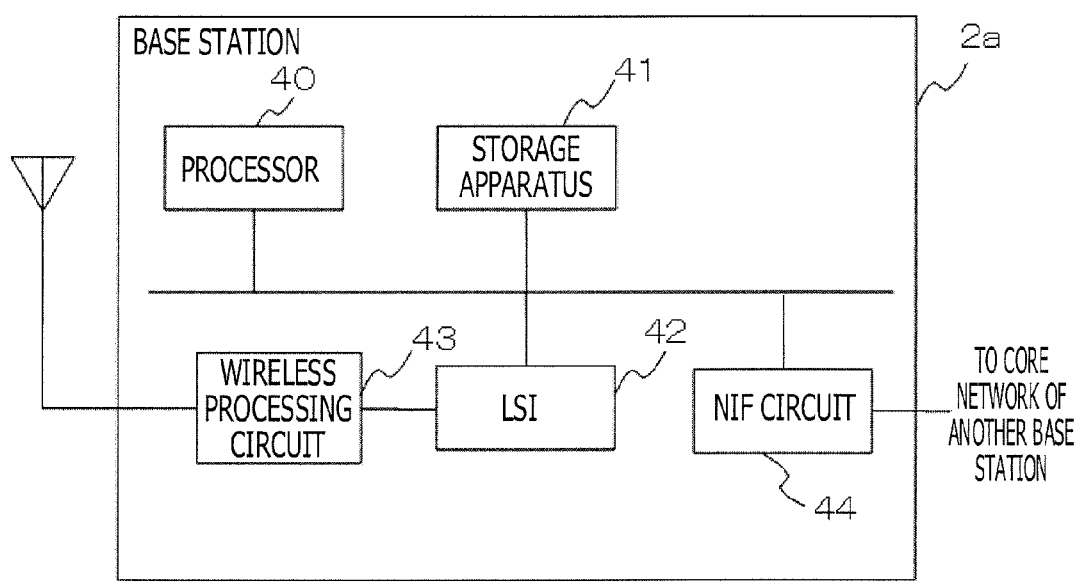
FIG. 16 is an explanatory diagram for describing an example of a hardware configuration of the femto base station apparatus.

FIG. 16 is an explanatory diagram for describing an example of a hardware configuration of the femto base station 2. The femto base station 2 is provided with a processor 40 such as a central processing unit (CPU), a storage apparatus 41, a large scale integration (LSI) 42, a wireless processing circuit 43, and a network interface circuit 44. In the following description and the accompanying drawings, a network interface may be referred to as "NIF" in some cases.

The storage apparatus 41 may include a non-volatile memory, a read only memory (ROM), a random access memory (RAM), a hard disc drive, or the like for storing a computer program or data. The processor 40 performs user management processing other than processing executed by the LSI 42 described below and the operation control of the femto base station 2 in accordance with the computer program stored in the storage apparatus 41.

The LSI 42 executes processing of encoding, modulating, demodulating, and decoding a signal transmitted and received between the mobile station 3 and the femto base station 2, communication protocol processing, and processing for the baseband signal in relation with scheduling. The LSI 42 may include a field-programming gate array (FPGA), an application specific integrated circuit (ASIC), a digital signal processing (DSP), or the like.

The wireless processing circuit 43 may include a digital analog conversion circuit, an analog digital conversion circuit, a frequency conversion circuit, an amplifier circuit, a filter circuit, or the like. The NIF circuit 44 is provided with an electronic circuit for communicating with the host node apparatus via a wired network by using a physical layer and a data link layer.

The above-mentioned operation by the wireless communication unit 10 of the femto base station 2 illustrated in FIG. 5 is executed by the wireless processing circuit 43. The above-mentioned operations by the reception processing unit 11 and the transmission processing unit 13 are executed by the LSI 42. The above-mentioned operations by the data processing unit 12, the control unit 14, and the quality information reception unit 15 are executed by the processor 40. The above-mentioned operation by the network communication unit 16 is executed by the NIF circuit 44.

Figure 17:
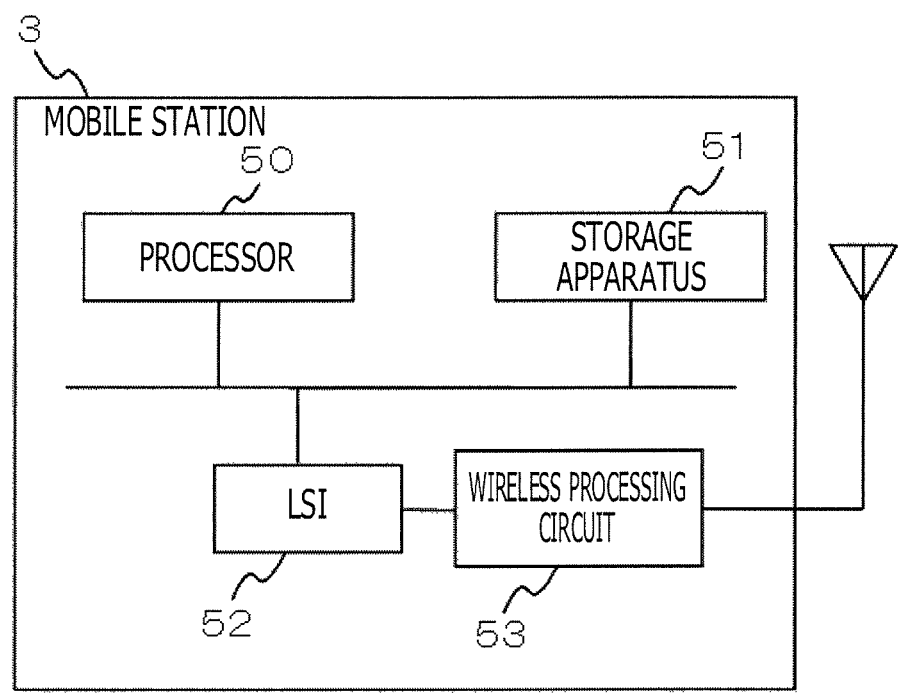
FIG. 17 is an explanatory diagram for describing an example of a hardware configuration of the mobile station apparatus.

FIG. 17 is an explanatory diagram for describing an example of a hardware configuration of the mobile station 3. The mobile station 3 is provided with a processor 50, a storage apparatus 51, an LSI 52, and a wireless processing circuit 53. The storage apparatus 51 may include a non-volatile memory, a read only memory, a random access memory, or the like for storing a computer program or data.

The processor 50 executes the operation control of the mobile station 3 other than processing executed by the LSI 52 described below, and an application program for processing the user data in accordance with the computer program stored in the storage apparatus 51.

The LSI 52 executes processing of encoding, modulating, demodulating, and decoding the signal transmitted and received between the mobile station 3 and the base station 2, communication protocol processing, and processing for the baseband signal in relation with scheduling. The LSI 52 may include the FPGA, the ASIC, the DSP, and the like. The wireless processing circuit 53 may include a digital analog conversion circuit, an analog digital conversion circuit, a frequency conversion circuit, or the like.

The above-mentioned operation by the wireless communication unit 30 of the mobile station 3 illustrated in FIG. 8 is executed by the wireless processing circuit 53. The above-mentioned operations by the reception processing unit 31 and the transmission processing unit 34 are executed by the LSI 52. The above-mentioned operations by the data processing unit 32 and the reception quality measurement unit 33 are executed by the processor 50.

The hardware configurations illustrated in FIG. 16 and FIG. 17 are only exemplifications for describing the embodiments. The base station described in the present specification and the mobile station may adopt any other hardware configurations so long as the above-mentioned operations are executed.

The function configuration diagrams of FIG. 5, FIG. 8, FIG. 11, and FIG. 14 mainly illustrate the configuration related to the function described in the present specification. The femto base station 2 and the mobile station 3 may include other components other than those illustrated in the drawings. The series of operations described with reference to FIG. 9 and FIG. 13 may be construed as a method including plural procedures. In this case, "operation" may be read as "step" instead.

According to the apparatus or the method disclosed in the present specification, it is possible to improve the control speed for the coverage area in the base station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless station comprising:
a receiver configured to receive information on a reception quality from a wireless communication apparatus that is wirelessly connected to the wireless station; and
a processor coupled to the receiver and configured to:
calculate, based on the reception quality, an index value indicating a difference between a signal-to-interference ratio in the wireless communication apparatus and transmission power of the wireless station,
calculate a statistical amount of the index value calculated with regard to each of the plurality of reception qualities, and
determine the transmission power in accordance with the statistical amount.

2. The wireless station according to claim 1,
wherein the processor calculates the statistical amount of the index value calculated with regard to the reception quality received during a period having a first period length, in a cycle having a second period length that is shorter than the first period length.

3. The wireless station according to claim 1,
wherein the processor is further configured to detect a generation of an interference between the wireless station and another wireless station,
wherein the processor calculates the statistical amount of the index value calculated with regard to the reception quality received in a reception period having a given length, and
wherein the processor decreases the transmission power from the wireless station irrespective of whether or not a time is in the reception period in a case where an interference between the wireless station and another wireless station is generated.

4. The wireless station according to claim 1,
wherein the processor calculates an index value at a given value of a cumulative distribution of the index value as the statistical amount.

5. The wireless station according to claim 1,
wherein the processor is further configured to correct a target signal-to-interference ratio in accordance with an gradient at the given value of the cumulative distribution of the index value, and
wherein the processor determines the transmission power in accordance with the corrected target signal-to-interference ratio and the statistical amount.

6. The wireless station according to claim 5,
wherein the processor corrects the target signal-to-interference ratio in accordance with the gradient at the value corresponding to the wireless communication apparatus at a cell edge.

7. The wireless station according to claim 1,
wherein the index value is a difference between the signal-to-interference ratio in the wireless communication apparatus and the transmission power of the wireless station.

8. The wireless station according to claim 1,
wherein the index value is a sum of the propagation loss between the wireless station and the wireless communication apparatus, and an interference power in the wireless communication apparatus.

9. A transmission power determination method comprising:
calculating, based on reception quality information received from a wireless communication apparatus that is wirelessly connected to a wireless station, an index value indicating a difference between a signal-to-interference ratio in the wireless communication apparatus and transmission power of the wireless station;
calculating a statistical amount of the index value calculated with regard to each of the plurality of reception qualities; and
determining, using a processor, the transmission power in accordance with the statistical amount.

10. The transmission power determination method according to claim 9,
wherein the determining includes calculating the statistical amount of the index value calculated with regard to the reception quality received during a period having a first period length, in a cycle having a second period length that is shorter than the first period length.

11. The transmission power determination method according to claim 9, further comprising:
detecting a generation of an interference between the wireless station and another wireless station,
wherein the determining includes calculating the statistical amount of the index value calculated with regard to the reception quality received in a reception period having a given length, and
wherein the determining includes decreasing the transmission power from the wireless station irrespective of whether or not a time is in the reception period in a case where an interference between the wireless station and another wireless station is generated.

12. The transmission power determination method according to claim 9,
wherein the determining includes calculating an index value at a given value of a cumulative distribution of the index value as the statistical amount.

13. The transmission power determination method according to claim 9, further comprising:
correcting a target signal-to-interference ratio in accordance with an gradient at the given value of the cumulative distribution of the index value,
wherein the determining includes determining the transmission power in accordance with the corrected target signal-to-interference ratio and the statistical amount.

14. The transmission power determination method according to claim 13,
wherein the correcting includes correcting the target signal-to-interference ratio in accordance with the gradient at the value corresponding to the wireless communication apparatus at a cell edge.

15. The transmission power determination method according to claim 9,
wherein the index value is a difference between the signal-to-interference ratio in the wireless communication apparatus and the transmission power of the wireless station.

16. The transmission power determination method according to claim 9,
wherein the index value is a sum of the propagation loss between the wireless station and the wireless communication apparatus, and an interference power in the wireless communication apparatus.

17. A communication system comprising:
a wireless communication apparatus configured to transmit information on a reception quality; and
a wireless station configured to:
receive the information on the reception quality from the wireless communication apparatus that is wirelessly connected to the wireless station,
calculate, based on the reception quality, an index value indicating a difference between a signal-to-interference ratio in the wireless communication apparatus and transmission power of the wireless station,
calculate a statistical amount of the index value calculated with regard to each of the plurality of reception qualities, and
determine the transmission power in accordance with the statistical amount.

\* \* \* \* \*